United States Patent
Chakra et al.

(10) Patent No.: US 9,619,570 B2
(45) Date of Patent: *Apr. 11, 2017

(54) SEARCHING CONTENT BASED ON TRANSFERRABLE USER SEARCH CONTEXTS

(71) Applicant: International Business Machines Corporation, Armonk, NY (US)

(72) Inventors: Al Chakra, Apex, NC (US); Liam Harpur, Dublin (IE); John Rice, Waterford (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 14/492,875

(22) Filed: Sep. 22, 2014

(65) Prior Publication Data

US 2015/0012517 A1 Jan. 8, 2015

Related U.S. Application Data

(63) Continuation of application No. 13/934,879, filed on Jul. 3, 2013.

(51) Int. Cl.
*G06F 7/00* (2006.01)
*G06F 17/30* (2006.01)
(Continued)

(52) U.S. Cl.
CPC ......... *G06F 17/30867* (2013.01); *H04L 9/30* (2013.01); *H04L 67/10* (2013.01); *H04L 67/306* (2013.01)

(58) Field of Classification Search
CPC ............... G06F 17/30; G06F 17/30864; G06F 17/30867; H04L 67/10; H04L 9/30; H04L 67/306

See application file for complete search history.

(56) References Cited

U.S. PATENT DOCUMENTS 7,958,143 B1   6/2011   Amacker
8,843,831 B2   9/2014   Brookhart et al.
(Continued)

OTHER PUBLICATIONS

Warren, P. et al.; "Context as a tool for organizing and sharing knowledge"; www.ceur-ws.org/Vol-626/regular/pdf . . . ; BT Innovation and Development; 2011; 15 pages.
(Continued)

*Primary Examiner* — Azam Cheema
(74) *Attorney, Agent, or Firm* — Joe Polimeni; Edell, Shapiro & Finnan, LLC (57) ABSTRACT

A search context is recorded during a search performed by a first user. The search context may include environmental variables associated with the computing equipment used by the first user such as at least one of regional settings, geographic location, social attributes, job role, browse history, and cookie files. The search context may be encrypted or be restricted for use by certain users and for a specific period of time. The search context may be sent to a second user or a group. The context is applied to environmental variables associated with the computing equipment used by the second user. The second user can thereby substantially duplicate the search performed by the first user.

5 Claims, 4 Drawing Sheets

(51) Int. Cl.
*H04L 29/08* (2006.01)
*H04L 9/30* (2006.01)

(56) References Cited

U.S. PATENT DOCUMENTS

| | | | |
|---|---|---|---|
| 8,898,183 | B2 | 11/2014 | Nickell et al. |
| 2005/0216434 | A1 | 9/2005 | Haveliwala et al. |
| 2006/0036659 | A1 | 2/2006 | Capriati et al. |
| 2008/0154859 | A1 | 6/2008 | Chi et al. |
| 2009/0282023 | A1 | 11/2009 | Bennett |
| 2010/0005087 | A1 | 1/2010 | Basco et al. |
| 2010/0031162 | A1* | 2/2010 | Wiser .............. G06Q 30/0255 715/747 |
| 2010/0114908 | A1 | 5/2010 | Chand et al. |
| 2010/0318489 | A1* | 12/2010 | De Barros .............. G06N 5/04 706/50 |
| 2012/0323953 | A1* | 12/2012 | Ortega .............. G06F 17/30997 707/767 |
| 2013/0290862 | A1* | 10/2013 | Chand .............. G06F 17/30867 715/745 |
| 2015/0012511 | A1 | 1/2015 | Chakra et al. |
| 2016/0147898 | A1 | 5/2016 | Chakra et al. |

OTHER PUBLICATIONS

Anonymous; "System and Method for Dynamic Content Delivery"; http://ip.com/IPCOM/000132581 . . . ; Dec. 22, 2005; 17 pages.
"Google SEO News and Discussion Forum", http://www.webmasterworld.com/forum30/28499.htm, Pubcon Inc., New Orleans 2013, 3 pages.
Snipes, Susan: "Reasons your Google search results are different than mine", http://themetaq.com/articles/reasons-your-google-search-results-are-different-than-mine, Apr. 3, 2012, 7 pages.
Brinkmann et al.: "Why Google Search Results Can Be Different", http://www.ghacks.net/2009/09/02/why-google-search-results-can-be-different/, Sep. 2, 2009, Ghacks.net, 7 pages.

* cited by examiner

SEARCHING CONTENT BASED ON TRANSFERRABLE USER SEARCH CONTEXTS

CROSS-REFERENCE TO RELATED APPLICATIONS

This application is a continuation U.S. patent application Ser. No. 13/934,879, entitled "SEARCHING CONTENT BASED ON TRANSFERRABLE USER SEARCH CONTEXTS" and filed Jul. 3, 2013, the disclosure of which is incorporated herein by reference in its entirety.

BACKGROUND

1. Technical Field

Present invention embodiments relate to searching content, and more specifically, to providing a search context of a first user to a second user to enable the second user to obtain search results similar to those of the first user.

2. Discussion of the Related Art

Searching for information is performed in a wide variety of contexts from World Wide Web (www)-based browser initiated searches, to basic research, to finding customer related information, and the like. To perform searches, a database or web search engine is employed to search data sources or repositories to retrieve documents or web pages based on the terms employed by the search.

When a particular user browses or searches online web content, a given search path is followed by the search engine based on multiple criteria, many of which form a user specific context (e.g., user location, regional setting, country, social attributes, job role, user search history, and/or user defined search options). Given the user specific nature of many web searches, the same search and corresponding search results are almost impossible to duplicate by another user. By way of example, if user A searches topic X and then passes information (e.g., search terms) to user B on topic X, it is nearly impossible for user B to follow the same search path as user A and obtain the same results. Thus, when user B initiates a search for the same content as user A, user B is likely to search under a different context than that associated with user A, and thereby Obtain different results than those obtained by user A.

Accordingly, traditional approaches to web or other searches may hamper collaboration among users that may be working on a particular project and benefit from the ability to duplicate search results among users.

BRIEF SUMMARY

According to one embodiment of the present invention, a system receives a first search context of a first user, Where the first search context includes parameters related to the first user for performing a search of content A search is conducted for content for a second user with a different second search context via a search engine by selectively utilizing the received first search context of the first user to enable the search engine to perform the search for the second user with the search context of the first user. Embodiments of the present invention further include a method and computer program product for conducting a search for content for a second user by selectively utilizing the received first search context of the first user in substantially the same manner described above.

DETAILED DESCRIPTION

Present invention embodiments optimize collaborative research by sharing search contexts among collaborators when searching similar data sources (e.g., web pages, databases, data repositories, etc.). Basically, the context captures the "essence" of one user's search environment, search pattern and results of interest. The context may be stored for later use to replicate the original search pattern and results, should those patterns and results remain available, i.e., websites and data repositories change over time thereby modifying the search landscape.

Accordingly, a method and system are disclosed which maintains the integrity of past context searches by recording and storing a user or user group specific context. At some point, the stored context is retrieved. The retrieved context may be used by the original user that defined the context or by another user such as a colleague, collaborative researcher, or an unknown user that would like to repeat the searches and obtain the same results as the user that created the context.

Once a context is defined, one user can send a message to another user, e.g., a message is sent from user A to user B. Briefly, the context message (FIG. 2) may contain user A's context for topic X as well as a query asking user B's opinion about topic X. User B, when researching topic X, can specify the use of user A's context (e.g., user A's web history, geographic location, regional settings, type ahead selections, etc.), when browsing a search engine (e.g. Google) for online content.

Figure 1:
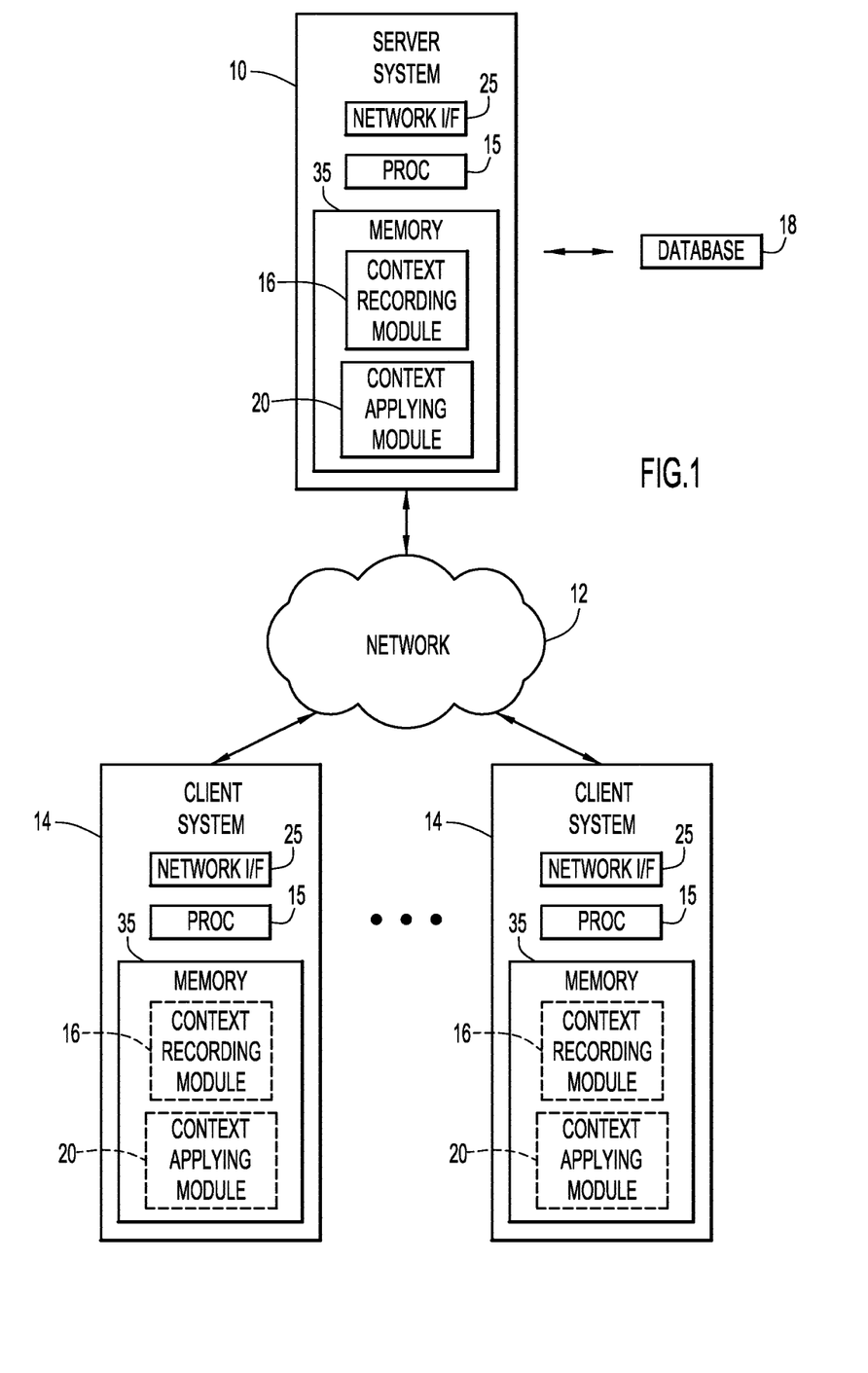
FIG. 1 is a diagrammatic illustration of an example computing environment for use with an embodiment of the present invention.

An example environment for use with present invention embodiments is illustrated in FIG. 1. Specifically, the environment includes one or more server systems 10, and one or more client or end-user systems 14. Server systems 10 and client systems 14 may be remote from each other and communicate over a network 12. The network may be implemented by any number of any suitable communications media (e.g., wide area network (WAN), local area network (LAN) Internet, intranet, etc.). Alternatively, server systems 10 and client systems 14 may be local to each other, and communicate via any appropriate local communication medium local area network (LAN), hardwire, wireless link, intranet, etc.).

Server systems 10 and client systems 14 may be implemented by any conventional or other computer systems preferably equipped with a display or monitor (not shown), a base (e.g., including at least one processor 15, one or more memories 35 and/or internal or external network interfaces or communications devices 25 (e.g., modem, network cards, etc.)), optional input devices (e.g., a keyboard, mouse or other input device), and any commercially available and custom software (e.g., server/communications software, context recording module, context applying module, browser/interface software, etc.).

Client systems 14 may receive user query information related to desired documents (e.g., documents, pictures, news stories, etc.) and provide queries to server systems 10. In another example, the information and queries may be received by the server, either directly or indirectly. The server systems include a context recording module 16 to record a context (e.g., a web site and database visits, search result, user environment, etc.), and a context applying module 20 to apply or remap the recorded context to the same or another computing environment. A database system 18 may store various forms of context based information (e.g., environmental variables, databases, documents, and search results, etc.). The database system may be implemented by any conventional or other database or storage unit, may be local to or remote from server systems 10 and client systems 14, and may communicate via any appropriate communication medium (e.g., local area network (LAN), wide area network (WAN), Internet, hardware, wireless link, intranet, etc.).

The client systems may present a graphical user interface (e.g., GUI, etc.) or other interface (e.g., command line prompts, menu screens, etc.) to solicit information from users pertaining to database queries, and may provide search results (e.g., document links, document relevance scores, etc.), such as in reports to the user, which client system 14 may present via the display or a printer or may send to another device/system for presenting to the user.

Alternatively, one or more client systems 14 may perform context processing when operating as a stand-alone unit. In a stand-alone mode of operation, the client system stores or has access to the data (e.g., document repositories, web sites, etc.), and includes context recording module 16 to perform context recording and context applying module 20 to apply the recorded context. The graphical user interface (e.g., GUI, etc.) or other interface (e.g., command line prompts, menu screens, etc.) solicits information from a corresponding user pertaining to searches such as the search terms and conditions, and may provide reports including search results (e.g., document links, document relevance scores, etc.).

Context recording module 16 and context applying module 20 may include one or more modules or units to perform the various functions of present invention embodiments described below. The various modules (e.g., context recording module, context applying module, etc.) may be implemented by any combination of any quantity of software and/or hardware modules or units, and may reside within memory 35 of the server and/or client systems for execution by processor 15. It is to be understood that any of server systems 10 and client systems 14 need not host both the recording module 16 and context applying module 20, but may host one module or the other.

Figure 2:
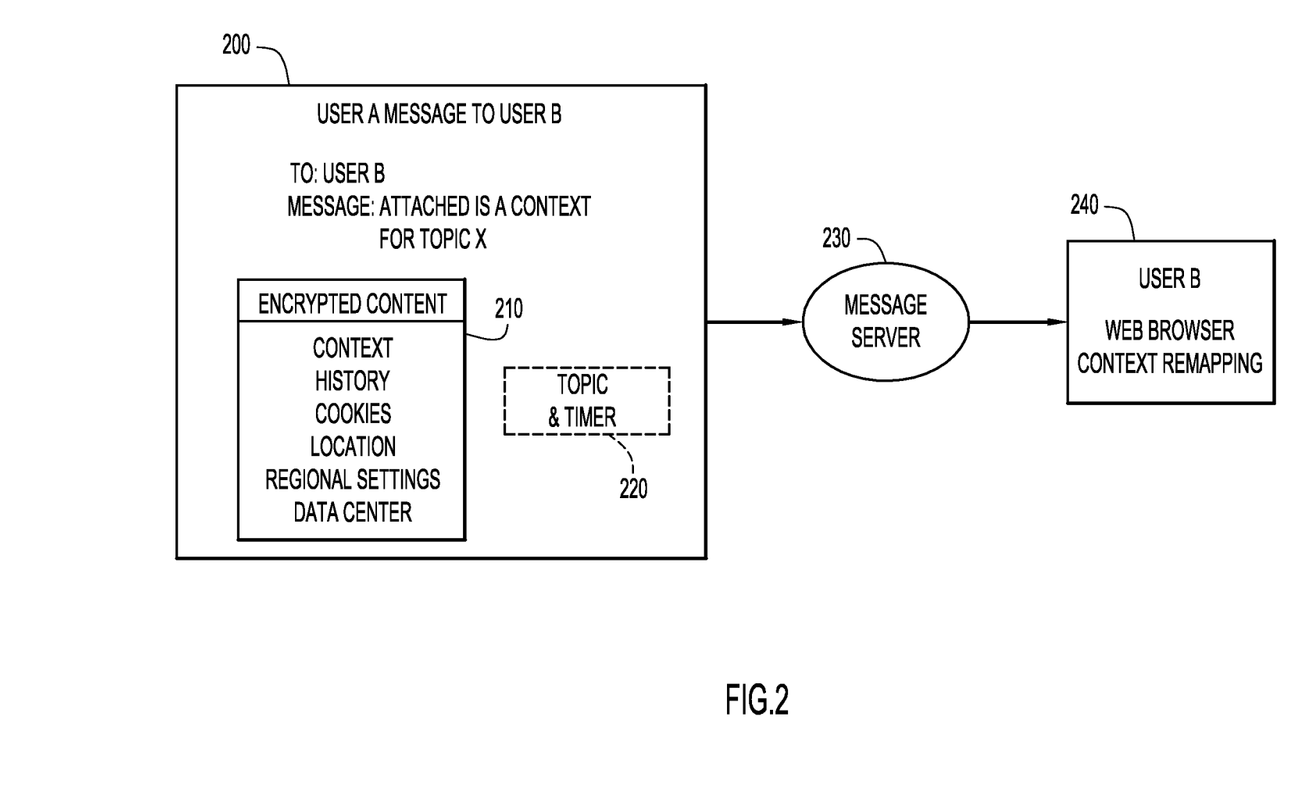
FIG. 2 is a diagrammatic illustration of an example context message that is sent from a first user to a second user according to an embodiment of the present invention.

A manner in which context recording module 16 and context applying module 20 (e.g., via a server system 10 and/or client system 14) performs context distribution according to an embodiment of the present invention is illustrated in FIG. 2. Specifically, a context message 200 is generated by a client system of a first user (e.g., user A), and sent to a client system of a second user (e.g., user B). The message may comprise text, an encrypted content 210. Context recording module 16 may provide optional context information 220 that may include a context topic and a timer; optional being indicated by the dashed box. The text may have an address (e.g., to user B) and a subject line message (e.g., "attached is a context for topic X") as indicated in the figure. Content 210 may be encrypted using any algorithm that enhances the security of the context (e.g., Public Key Infrastructure (PKI) encryption scheme).

Encrypted content 210 may contain, among other items, a context definition with a search history and results, browser cookies, user search location, regional settings, and data center addresses or names. Context information 220 associates the context topic with an expiration time. For example, the context may be made available for a number of hours or days, or may be available indefinitely. The context may also be made available to one or more specific users or user groups (e.g., members of a legal team authorized to litigate a particular case). In one example, user A may be a legal research entity and user B may be the litigation team at a particular law firm. In other situations, user A may be tutoring user B, when user A and B are at different locations, or on different continents (with language based differences); or in a business social environment where colleagues and trusted members share their cookies and background content.

Thus, the user's social or individual, or business attribute may be included while recording and applying a given context. For example, in a business environment, company name, division, product line, or other business attributes may play a role in context development. Social or individual attributes may include organizational memberships, gender, birthplace, nationality, family origins, or other individual attributes.

Context 210 may specify language indicators (e.g., English, German, Japanese, etc.). In this regard, context 210 may be adapted to the language of the context user. Context 210 may be fitted with language translations or provide other information that can be used such as a recommended translation, translation engine, other information to facilitate the context application within the user's computing environment.

Message 200 may be sent to a client system of a second user 240 (e.g., user B) by way of message server 230. The message server may be an email server such as Outlook®. The message may be sent without a message server or by any other available techniques including recorded media (e.g., computer disk, flash drive, etc.). Users may inherit or obtain tokens that are passed via a pee-to-peer system or a spoke and hub type system. Social networks (e.g., Facebook, Twitter, etc.) may be used to distribute or allow the purchase of contexts. The context owner may also send the context in response to a request from another entity.

The client system of user B receives the message or retrieves the message from message server 230. Encrypted content 210 is decrypted by the client system of user B and the context is obtained. The context is applied to a search engine on user B's client system and user B can thereby repeat search results that were originally obtained by user A. User B can collaborate with user A or use the results for the benefit of user B.

In one embodiment, the computing environment enables user A's context to be applied to user B's client system by way of permissions contained in the context or embedded in a message (e.g., message 200), and when user B opens a browser, the context is applied automatically upon operation of the browser, perhaps via a link in the context message, or the context may be applied after user B responds to an inquiry (e.g., a pop-up message). User B's browser may use user A's context as a "local" context (i.e., local to the users browser) for a given time period. Contexts may be exchanged either directly or within tokens exchanged between users, or tokens may be exchanged between users that act as a permission certificate to access a context within a message or retrieve the context from a storage location (e.g., a repository, database, or message server).

Figure 3A:
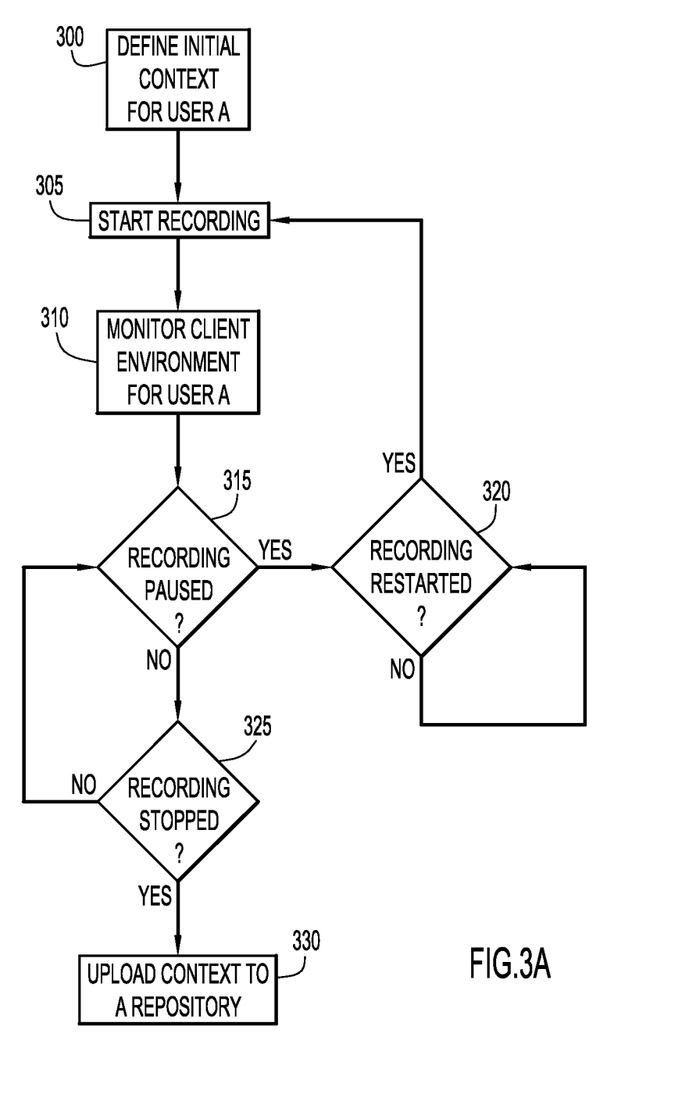
FIG. 3A is a procedural flow chart illustrating a manner in which a context is recorded for a first user according to an embodiment of the present invention.
Figure 3B:
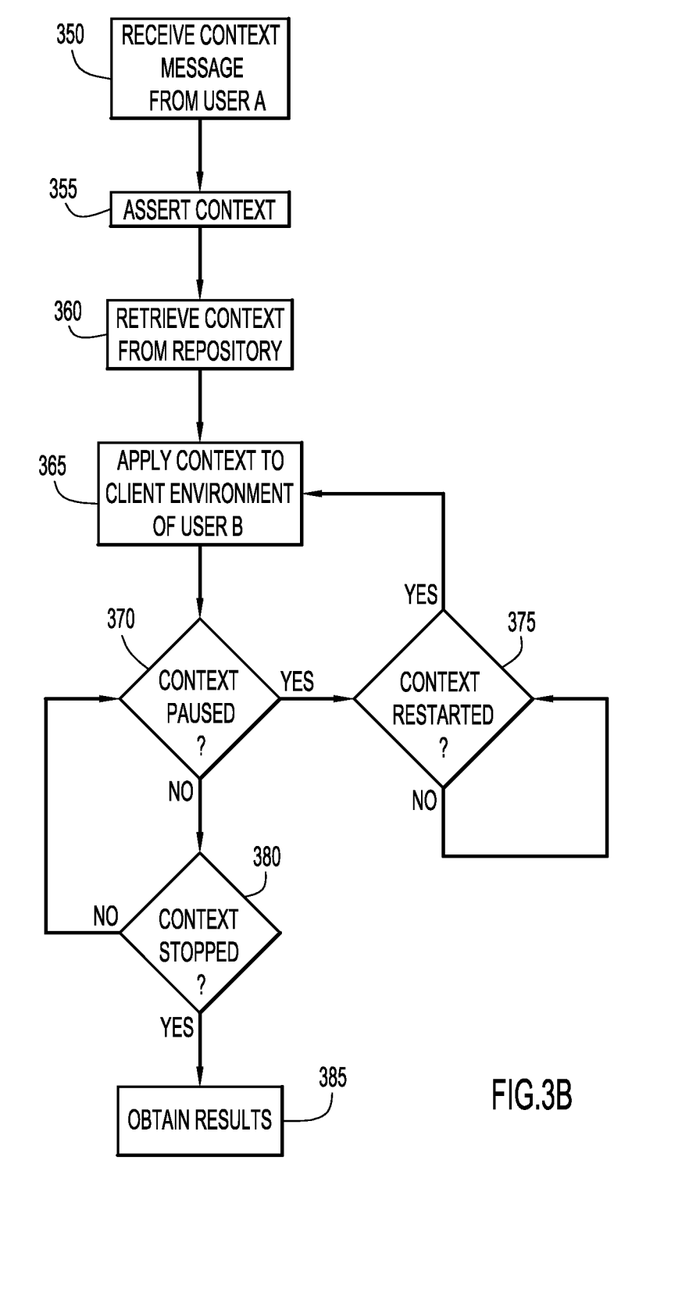
FIG. 3B is a procedural flow chart illustrating a manner in which the context from the first user is applied for a second user according to an embodiment of the present invention.

A manner in which context recording module 16 and context applying module 20 (e.g., via a server system 10 and/or client system 14) performs context recording and application of the recorded context according to an embodiment of the present invention is illustrated in FIGS. 3A and 3B. Specifically, an initial context is defined for a first user (e.g., user A) at step 300 (FIG. 3A). The context may be defined by the user, or the client system may be configured to automatically define a context (e.g., by a context recording agent executed by the client operating system (OS) as a background process such as context recording module 16). The context may include a topic defined by the user. In another example, the client system may determine the topic based on the terms entered by the user. The context may include the current state of the user's environment as described above.

Once the initial context is defined, user client operations are recorded at step 305. Recording may be started before the topic or context is defined (e.g., by context recording module 16 that defines the topic by monitoring after the recording is started). Recorded client operations may include recording search terms that are monitored or recorded while the user is typing. Recording may include raw text or browser initiated "type ahead" features that fill in user search terms based on most commonly used search terms and user options.

The user's context helps to provide customized search results. For example, if user A is researching topic X, then the user will receive an individual response from the search engine (e.g., Google, Lycos, or internally used engine) for topic X. If user B is searching for topic X then the different location, cookies and regional settings for user B may lead to a different set of results. Thus, it is difficult for user B to navigate to topic X through the same path as user A. However, according to an embodiment of the present invention, user A can pass their search context information to user B for searching topic X. Then, when user B carries out a search on topic X, user B will receive the same search response as user A.

The client environment for user A is monitored at step 310. The topic of the context may change during recording. By way of example, the user may search for "sporty cars." Of the many results, the user may choose "BMW" and "Porsche" as known sporty car models. The search may be further narrowed. For example, the terms "brakes" or "oil filters" may be added to the original search terms, or a new search may be initiated using "music players" as a search term. As such, the context may be subdivided into sub-contexts or partitioned into a plurality of contexts that may be linked to each other by a linking mechanism. As each context is recorded, the environmental information may also be recorded. The environmental information may change with topic changes, over time, or based on other events (e.g., user initiated changes). The environmental information may be recorded as a separate track or subdivided along with the context variations. The context and the associated variations and subdivision may be sent to another end user (e.g., user B by way of message 200 (FIG. 2)).

Context recording module 16 may provide a text analysis platform that acquires and transforms the source documents, performs basic linguistic processing (including language determination and tokenization), and stores the analyzed documents and extracted information in a search index for semantic search. The analyzed documents and extracted information may further be stored in a relational database for data mining on the discovered information that may be provided in the recorded context. The context may also provide some form of document indexing.

The context, or parts thereof, may be stored as Extensible Markup Language (XML) tags that correspond to the structure of the original documents, or as data pointers into a document (e.g., a relative data address, a paragraph number, line number, character position, etc.). Accordingly, the index in one example may be a record that contains search terms or phrases, and tags or pointers to the source document or relevant portions thereof. Put another way, the index may contain search terms and their corresponding postings list (e.g., a list of documents, or portions thereof, for which a particular search term is applicable). Thus, the index forms an abbreviated representation of the source document.

Context recording module 16 may use or include text analysis engines (TAE) (also referred to as analysis engines or annotators) that implement the actual document analysis algorithms. Annotators may create annotations that include meta-data information associated with a particular location or span in the original unstructured data or document. Examples of annotations that may be applied to text documents include annotations that identify sequences of characters as an entity name, an entity telephone number, product flavor, product size, etc. The text analysis engines (TAE) may be designed to interpret and account for common spelling errors, grammatical mistakes, and punctuation. In addition, advanced text analysis engine (TAE) functions may include identification of relationships between items or major topics discussed in the text.

Take, as an example, a World Wide Web (WWW) document or web site. The techniques described herein, can be used to monitor and track website visits which were a result of successful searches, i.e., the web site was opened as a result of the web browser query entered by a user. The opened website or accessed query result may be referred to as a successful access.

A further consideration for what may be considered a viable web site successful access may be that the user spends a certain amount of time (e.g., 60 seconds or more) viewing the site (or viewing the retrieved document). Another marker of successful access may be occurrence of an event in which a user further selects secondary documents that may be linked within the first accessed document (e.g., using a hyperlink).

A list of search words, word combinations, and phrases may be maintained in a list (i.e., the words and phrases that result in a website hit). A search can be based on a logical combination of words successfully entered by user that results in desired content for the user. Any subsequent updates to the site can be monitored for these words or phrases. The user enters search terms that generate a query in order to retrieve desired documents or web sites. The queries may contain simple keywords or more complex grammar-like constructs. A query keyword represents an item of interest to the user. For example, the query may contain nouns, noun alternatives and plurals, conjunctions or other Boolean terms (e.g., not, or, and, and exclusive-or), etc. if the query contains a noun, the noun may be "package" and the alternatives are "packages," "container," and "containers," where there is an implied "or" construct when alternatives are provided. Thus, the noun may be "package", "packages", "container", or "containers". Furthermore, Boolean query constructs may be used. For example, queries may be "term1 AND not term2" or "term1 OR term2," etc.

Thus, accessed websites, websites that have a successful access, and viewed documents may be stored as a link in the context. Portions of the accessed documents (e.g., abstracts, summaries, etc.) may be also stored in the context to allow the user (e.g., user B) to view a preview of the document prior to actual document retrieval. Furthermore, search keywords and Boolean operators may be stored in the context. The keywords and Boolean operators may or may not be made available to the end user.

During recording, context recording module 16 may pause the recording at step 315. The pause may be initiated after a period of inactivity (e.g., the user goes to lunch), a context change, or the user may "pause" the recording by way of recording options such as a pause button. If the context is paused, a wait loop is initiated at step 320. If the recording is restarted, recording is again started at step 305. If the recording is not restarted, the recording may time out after a period of time and recording module 16 may allow subsequent recording to be restarted. Otherwise, the recording may be stopped at step 325. When the recording is not stopped, the recording module 16 loops back to step 315 (i.e., it continues recording). If the recording is stopped, either by the user or by recording module 16, the context is stored or uploaded to a repository at step 330. Depending on the environment, the context may be stored locally, in a standard database, or on a secure or stand alone server.

Once the context is uploaded, a second user (e.g., user B) may use the context according to an embodiment of the present invention that is illustrated in FIG. 3B. The context or a representation of the context (e.g., a link to an address) is received at step 350. The context notification may be received as a message as described above in connection with FIG. 2. The context is asserted by user B at step 355. By assertion, the contents of user A's context reveals the location of the context, should the context be stored or be too large for a message. The context is retrieved at step 360 (e.g., from a repository, database, or from the message sent by user A).

The context is applied at step 365, for example, by being mapped into user B's computing environment (e.g., by context applying module 20), i.e., the context of user A modifies user B's environment to match the relevant variables of user A's environment during user A's context development or recording. Conceptually, user A's context may be applied by context applying module 20 to user B in order for user B to substantially recreate user A's experience/results.

The applied context from user A may lead user B by way of a context "replay" to duplicate user A's search or results. The replay may be continuous or a step by step approach that does not necessarily correspond in time to the context recorded by user A. For example, user A's context may be recorded in real time, while user B may be presented with a replay stepping mechanism whereby user B can "click" though user B's context in a time lapse fashion.

During replay, context applying module 20 may pause the context application at step 370. The pause may be initiated after a period of inactivity (e.g., the user goes to lunch), a context change, or the user may "pause" the replay by way of replay options such as a pause button. If the context replay is paused, a wait loop is initiated at step 375. If the replay is restarted, context application is started at step 365. If the replay is not restarted, the replay may time out after a period of time and applying module 20 may allow a subsequent replay to be restarted. Otherwise, context replay may be stopped at step 380. When the replay is not stopped, the applying module 20 loops back to step 370 (i.e., it continues replay). If the replay is stopped, either by the user or by applying module 20, the replay results (e.g., at the time, if replay is stopped early) are provided at step 385. The replay results may be stored (e.g., depending on the environment, either locally or in a database (e.g., database 18)).

Search contexts may be treated like commodities. For example, a search context may contain the knowledge and expertise of a first researcher. A second researcher, perhaps one with different expertise or in need of the expertise of the first researcher, may wish to build upon what the first researcher has provided by way of the search context. Thus, the context has intellectual value and may be sold or traded. In other examples, context may contain legal or scientific expertise, or searches performed by famous individuals. People will be willing to pay to repeat the original search using the context created by certain individuals or entities.

It will be appreciated that the embodiments described above and illustrated in the drawings represent only a few of the many ways of implementing recording and applying a search context to another user.

The environment of the present invention embodiments may include any number of computer or other processing systems (e.g., client or end-user systems, server systems, etc.) and databases or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., browser software, communications software, server software, context recording module, context applying module, etc.). These systems may include any types of monitors and input devices (e.g., keyboard, mouse, voice recognition, etc.) to enter and/or view information.

It is to be understood that the software (e.g., context recording module, context applying module, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., context recording module, context applying module, etc.) may be available on a recordable or computer useable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any type of communications network (e.g., LAN, WAN, Internet, intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, intranet, etc.).

The system may employ any number of any conventional or other databases, data stores or storage structures (e.g., files, databases, data structures, data or other repositories, etc.) to store information (e.g., contexts and context information such as documents, document collections, search results, keyword lists, indexes, etc.). The database system may be implemented by any number of any conventional or other databases, data stores or storage structures (e.g., files, databases, data structures or tables, data or other repositories, etc.) to store information (e.g. contexts and context information such as documents, document collections, search results, keyword lists, indexes, etc.). The database system may be included within or coupled to the server and/or client systems. The database systems and/or storage structures may be remote from or local to the computer or other processing systems, and may store any desired data (e.g., documents, document collections, search results, keyword lists, indexes, etc.). Further, the various tables (e.g., contexts and context indexes, etc.) may be implemented by any conventional or other data structures (e.g., files, arrays, lists, stacks, queues, etc.) to store information, and may be stored in any desired storage unit (e.g., database, data or other repositories, etc.).

Present invention embodiments may be utilized for determining any desired context by recording information (e.g., keywords, etc.) from any type of document (e.g., speech transcript, web or other pages, word processing files, spreadsheet files, presentation files, electronic mail, multimedia, etc.) containing text in any written language (e.g. English, Spanish, French, Japanese, etc.). The context recording may include any type of user interactions with the user's client system such as user keystrokes, document link or other any other types of link activation, and user responses to requested information data entries, query responses, etc.).

The context indexes may be developed in any manner (e.g., manually developed, based on a template, etc.) and contain any type of data (e.g., names, nouns, verbs, numbers, etc.) and/or rules (e.g., grammatical, lexical, or mathematical constructs). The context indexes may be designed in any manner that facilitates tagging or document searching and analysis by an analysis engine or annotator. The context indexes may be in any format (e.g., plain text, relational database tables, nested XML code, etc.). Any number of context indexes may be used for document searching.

Context data or indexes may be developed using any manner of analysis (e.g., linguistic, semantic, statistical, machine learning, natural language processing, etc.). Context development may use any form of information retrieval and lexical analysis to analyze word frequency distributions, and perform pattern recognition, tagging, annotation, information extraction, and/or data mining. Index development techniques may include link and association analysis, visualization, and predictive analytics.

Context recording and applying modules may be developed in any manner suitable for their respective computing environments. Context recording may also include a users video or audio such that the user may provide a narrative as the context is recorded. The applying module may play such video or audio during context playback.

The present invention embodiments may employ any number of any types of user interface (e.g., Graphical User Interface (GUI), command-line, prompt, etc.) for obtaining or providing information (e.g., documents, document collections, search results, keyword lists, indexes, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks or algorithms described above, but may be utilized for recording and applying contexts associated with any type of documents. The contexts may be selectively applied (e.g., a user may elect to apply their context or the context of another user or user group.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (Java and all Java-based trademarks and logos are trademarks of Sun Microsystems, Inc. in the United States, other countries, or both), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method of searching content comprising;
    receiving, by a system from a first client system, a message including text and encrypted content, the encrypted content including a first search context of a first user, wherein the first search context includes parameters related to the first user for performing a search of content, the first search context captures an essence of a search environment, a search pattern and results of interest of the first user, and a context topic and an expiration time included in the message associate the context topic with the expiration time;
    decrypting the received first search context; and
    conducting a search for content for a second user with a different second search context via a search engine by selectively utilizing the received first search context of the first user to enable the search engine to perform the search for the second user with the first search context of the first user, wherein:

utilization of the received first search context for selective use when performing the conducting of the search for the content for the second user is restricted based on the expiration time and the context topic.

2. The computer-implemented method of claim 1, wherein the parameters of the first search context include at least one of regional settings, geographic location, social attributes, job role, browse history, and cookie files.

3. The computer-implemented method of claim 1, wherein conducting a search for content includes:

selecting one of the first and second search contexts, and conducting the search for content for the second user utilizing the selected search context.

4. The computer-implemented method of claim 1, and further comprising recording the first search context.

5. The computer-implemented method of claim 1, further comprising recording a third search context during a search performed by the second user.

* * * * *